United States Patent
Poluzzi et al.

(10) Patent No.: US 7,028,015 B2
(45) Date of Patent: Apr. 11, 2006

(54) FILTERING DEVICE AND METHOD FOR REDUCING NOISE IN ELECTRICAL SIGNALS, IN PARTICULAR ACOUSTIC SIGNALS AND IMAGES

(75) Inventors: Rinaldo Poluzzi, Milan (IT); Cristoforo Mione, Olginate (IT); Alberto Savi, San Donato Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 960 days.

(21) Appl. No.: 09/996,014

(22) Filed: Nov. 28, 2001

(65) Prior Publication Data

US 2002/0123975 A1 Sep. 5, 2002

(30) Foreign Application Priority Data

Nov. 29, 2000 (EP) .......................................... 00830782

(51) Int. Cl.
*G06F 15/18* (2006.01)

(52) U.S. Cl. .............................................. 706/1; 760/2

(58) Field of Classification Search ...................... 706/1, 706/2
See application file for complete search history.

(56) References Cited

U.S. PATENT DOCUMENTS

| | | | | | |
|---|---|---|---|---|---|
| 5,220,373 | A | * | 6/1993 | Kanaya | ........................ 399/42 |
| 5,371,695 | A | * | 12/1994 | Baraszu | ...................... 708/322 |
| 6,208,981 | B1 | * | 3/2001 | Graf et al. | ..................... 706/2 |

OTHER PUBLICATIONS

A new postprocessing algorithm to reduce artifacts in block-coded images Mancuso, M.; Besana, M.; Poluzzi, R.; Consumer Electronics, IEEE Transactions on ,vol.: 43, Issue: 3, Aug. 1997 pp.: 303–307.*

Fuzzy logic based image processing on IQTV environment Mancuso, M.; D'Alto, V.; De Luca, R.; Poluzzi, R., Rizzotto, G.G.; Consumer Electronics, IEEE Transactions on ,vol. 41 , Issue: 3 , Aug. 1995 pp.: 917–925.*

PROXIMA: PROlog eXecutIon MAchine Baldi, L.; Civera, P.; Iurlaro, A.; Masera, G.; Pagni, A.; Piccinini, G.; Poluzzi, R.; Roch, M.R.; Zamboni, M.; Solid–State Circuits, IEEE Journal of ,vol.: 28, Issue: 3 , Mar. 1993 pp.: 362–370.*

(Continued)

*Primary Examiner*—Anthony Knight
*Assistant Examiner*—Michael B. Holmes
(74) *Attorney, Agent, or Firm*—Lisa K. Jorgenson; E. Russell Tarleton; Seed IP Law Group PLLC

(57) ABSTRACT

A neuro-fuzzy filter device that implements a moving-average filtering technique in which the weights for final reconstruction of the signal are calculated in a neuro-fuzzy network according to specific fuzzy rules. The fuzzy rules operate on three signal features for each input sample. The signal features are correlated to the position of the sample in the considered sample window, to the difference between a sample and the sample at the center of the window, and to the difference between a sample and the average of the samples in the window. The filter device for the analysis of a voice signal includes a bank of neuro-fuzzy filters. The signal is split into a number of sub-bands, according to wavelet theory, using a bank of analysis filters including a pair of FIR QMFs and a pair of downsamplers; each sub-band signal is filtered by a neuro-fuzzy filter, and then the various sub-bands are reconstructed by a bank of synthesis filters including a pair of upsamplers, a pair of FIR QMFs, and an adder node.

40 Claims, 10 Drawing Sheets

OTHER PUBLICATIONS

Neuro–fuzzy filtering techniques for automatic speech recognition enhancement Poluzzi, R.; Arnone, L.; Savi, A.; Brescianini, M., Intelligent Signal Processing, 2003 IEEE International Symposium on , Sep. 4–6, 2003 pp.: 255–258.*

A New Post–processing Algorithm To Reduce Artefacts In Block–coded Images Mancuso, M.; Besana, M.; Poluzzi, R.;Consumer Electronics, 1997. Digest of Technical Papers. ICCE., International Conference on , Jun. 11–13, 1997 pp.: 30–37*

Fuzzy Logic Based Image Processing in IQTV Environment Mancuso, M.; D'Alto, V.; DeLuca, R.; Poluzzi, R.; Rizzotto, G.G.; Consumer Electronics, 1995., Proceedings of International Conference on , Jun. 7–9, 1995 pp.: 138.*

Fuzzy edge–oriented motion–adaptive noise reduction and scanning rate conversion Mancuso, M.; D'Alto, V.; Poluzzi, R.;Circuits and Systems, 1994. APCCAS '94., 1994 IEEE Asia–Pacific Conference on , Dec. 5–8, 1994 pp.: 652–656.*

Hardware and software integrated toolkit for low cost analog fuzzy controllers Franchi, E.; Rovatti, R.; Manaresi, N.; Ragazzoni, R.; Guerrieri, R.; Baccarani, G.; Poluzzi, R.; Industrial Electronics, Control and Instrumentation, 1994. IECON '94., vol. 2.*

Automatic synthesis, analysis and implementation of a fuzzy controller Pagni, A.; Poluzzi, R.; Rizzotto, G.; Lo Presti, M.; Fuzzy Systems, 1993., Second IEEE International Conference on, Mar. 28–Apr. 1, 1993 pp.: 105–110 vol. 1.*

DC/DC converters fuzzy control Pagni, A.; Poluzzi, R.; Rizzotto, G.; Lo Presti, M.; Industrial Fuzzy Control and Intelligent Systems, 1993., IFIS '93., Third International Conference on , Dec. 1–3, 1993 pp.: 14–17.*

A Monte Carlo model of noise components in 3D PET Castiglioni, I.; Cremonesi, O.; Gilardi, M.-C.; Savi, A.; Bettinardi, V.; Rizzo, G.; Bellotti, E., Fazio, F.; Nuclear Science, IEEE Transactions on ,vol. 49 , Issue: 5, Oct. 2002 pp.: 2297–2303.*

Iterative reconstruction of SPECT data with adaptive regularization Riddell, C.; Buvat, I.; Savi, A.; Gilardi, M.-C.; Fazio, F.;Nuclear Science, IEEE Transactions on ,vol.: 49 , Issue: 5, Oct. 2002 pp.: 2350–2354.*

Scatter correction techniques in 3D PET: a Monte Carlo evaluation Castiglioni, I.; Cremonesi, O.; Gilardi, M.C.; Bettinardi, V.; Rizzo, G.; Savi, A.; Bellotti, E., Fazio, F.; Nuclear Science, IEEE Transactions on ,vol.: 46, Issue: 6, 1999 pp.: 2053–2058.*

Frequency weighted least squares reconstruction of truncated transmission SPECT data Riddell, C.; Savi, A.; Gilardi, M.C.; Fazio, F.; Nuclear Science, IEEE Transactions on ,vol.: 43 , Issue: 4 , Aug. 1996 pp.: 2292–2298.*

Lesion detectability and quantification in PET/CT oncological studies by Monte Carlo simulations Castiglioni, I.; Rizzo, G.; Gilardi, M.C.; Bettinardi, V.; Savi, A.; Fazio, F.; Nuclear Science Symposium Conf Record, 2003 IEEE ,vol.: 5 , pp.: 3032–3035.*

Fast reconstruction of truncated transmission SPECT data Riddell, C.; Savi, A.; Gilardi, M.C.; Fazio, F.; Nuclear Science Symposium and Medical Imaging Conference Record, 1995., 1995 IEEE ,vol.: 2, Oct.21–28, 1995 pp.: 1107–1110 vol. 2.*

Tsai, H. et al., "On the Design of Neuro–Fuzzy Hybrid Multichannel Filters to Remove Impulsive Noise for Color Image Restoration," *Journal of Electronic Imaging*, 9(2):117–139, Apr. 2000.

Castellanos, R. et al., "Performance of Nonlinear Methods in Medical Image Restoration," in *Proceedings of the IS&T/SPIE Conference on Nonlinear Image Processing X*, Dept. of Elec. Engineering, Texas Tech. Univ., San Jose, California, Jan. 1999, pp. 252–258.

Di Giura, M. et al., "Adaptive Fuzzy Filtering for Audio Applications Using Neuro–Fuzzy Modelization," in *Proceedings of IEEE International Conf. On Neural Networks*, Houston,Texas, Jun. 1997, pp. 2162–2166.

Russo, F., "Hybrid Neuro–Fuzzy Filter for Impulse Noise Removal," *Journal of Patent Recognition*, 32(11):1843–1855, 1999.

Ainsleigh, "B–Wavelet–Based Noise–Reduction Algorithm," *IEEE Trans. on Signal Processing*, 44(5):1279–1284, May 1996.

Arakawa, K., "Fuzzy Rule–Based Signal Processing and Its Application to Image Restoration," *IEEE Journal on Selected Areas in Communications*, 12(9):1495–1502, Dec. 1994.

Cohen, A. et al., "Wavelets: The Mathematical Background," *Proceedings of the IEEE*, 84(4):514–522, Apr. 1996.

Hess–Nielsen, N. et al., "Wavelets and Time–Frequency Analysis," *Proceedings of the IEEE*, 84(4):523–540, Apr. 1996.

* cited by examiner

FILTERING DEVICE AND METHOD FOR REDUCING NOISE IN ELECTRICAL SIGNALS, IN PARTICULAR ACOUSTIC SIGNALS AND IMAGES

BACKGROUND OF THE INVENTION

1. Field of the Invention

The present invention refers to a filtering device and method for reducing noise in electrical signals, in particular acoustic (voice) signals and images.

2. Description of the Related Art

As is known, filters operating according to various linear and nonlinear techniques are used to remove undesired components from electrical signals. In particular, undesired components may be any type of noise (white noise, flicker, etc.) or other types of superimposed acoustic or visual signals.

Linear filters are at present the most widely used instruments for filtering noise. Finite-impulse filters (FIRs) eliminate all the harmonics of a signal having a frequency higher than the cutoff frequency of the filter and improve the signal-to-noise ratio (SNR). Another linear filtering technique is based on the fast Fourier transform (FFT), where the signal is transformed into the frequency domain, the undesired harmonics are removed, and then the inverse Fourier transform is calculated.

As far as nonlinear techniques are concerned, average filters are simple to design and may be implemented through simple hardware circuits. Average filters are based on the comparison of the individual signal samples in an time interval with the average of all the samples in the same time interval. On the basis of this comparison, the individual samples are selectively attenuated.

All these methods share the disadvantage that, when removing the noise, also some of the components of the original signal are removed.

Furthermore, none of the current techniques, whether linear or nonlinear ones, including average filtering, is able to preserve steep edges of the signal. If a moving-average filter is used, the width of the window must be very small if steep edges are to be preserved. However, if the size of the window becomes small, there is no significant reduction in noise energy. If linear filters are used, all the frequencies above the cutoff frequency are eliminated, with consequent marked distortion of the signal.

BRIEF SUMMARY OF THE INVENTION

The embodiments of the invention provide a filtering method and device that does not cause a sensed deterioration of the signal and at the same time preserves the edges of the signal.

The filter and the method described are particularly useful in the case of signals having steep edges, for which the aim is to preserve the edges of the signals. Furthermore, it is possible to filter signals affected by white and non-white noise, such as flicker noise. Through the present method it is moreover possible to eliminate from a signal other signals that are superimposed on it and are characterized by a wide spectral range.

The device and the method described are based upon a neuro-fuzzy network. They are implemented with a moving-average filtering technique in which the weighting factors (or weights) for the final reconstruction of the signal are calculated in a neuro-fuzzy network according to specific fuzzy rules. This enables a better reduction of the noise. The fuzzy rules operate on different variables, referred to as signal features. Described hereinafter are three signal features and six fuzzy rules.

The proposed filter is suitable for visual signals or acoustic signals, even ones with sudden variations. Various types of functions or signal features can be used to create the rules. With the method described, the signal features are correlated to the position of the sample in the considered sample window, to the difference between a given sample and the sample at the center of the window, and to the difference between a given sample and the average of samples in the window. These signal features may have a considerable influence on the values of the weights for the reconstruction of the signal; in addition, they may be calculated in a relatively simple manner.

The method and the filter according to the invention moreover comprise a neuro-fuzzy filter bank. In this way, the signal may be split into different sub-bands according to wavelet theory: Each sub-band signal may be filtered by a neuro-fuzzy network, and then the various sub-bands can be reconstructed by the synthesis filter bank. As is known from wavelet theory, in the first sub-band the signal features have a low frequency, whereas in the last sub-band the signal features have the maximum frequency. If non-white noise (colored noise) is to be removed, this is approximated by white noise in each individual sub-band. Given that a neuro-fuzzy network works well on white noise, this solution leads to a sensible reduction in noise.

The network is trained by supplying some configurations of input and output signals (the configuration of the output signal that it is required to obtain as a result of the network evolution is called target configuration). The training algorithm is based upon one of the known learning methods, such as gradient descent, a genetic algorithm, the simulated annealing method, random search, or any other method for function optimization.

BRIEF DESCRIPTION OF THE SEVERAL VIEWS OF THE DRAWING(S)

For an understanding of the present invention, preferred embodiments thereof are now described, purely to furnish non-limiting examples, with reference to the attached drawings, in which.

DETAILED DESCRIPTION OF THE INVENTION

Figure 1:
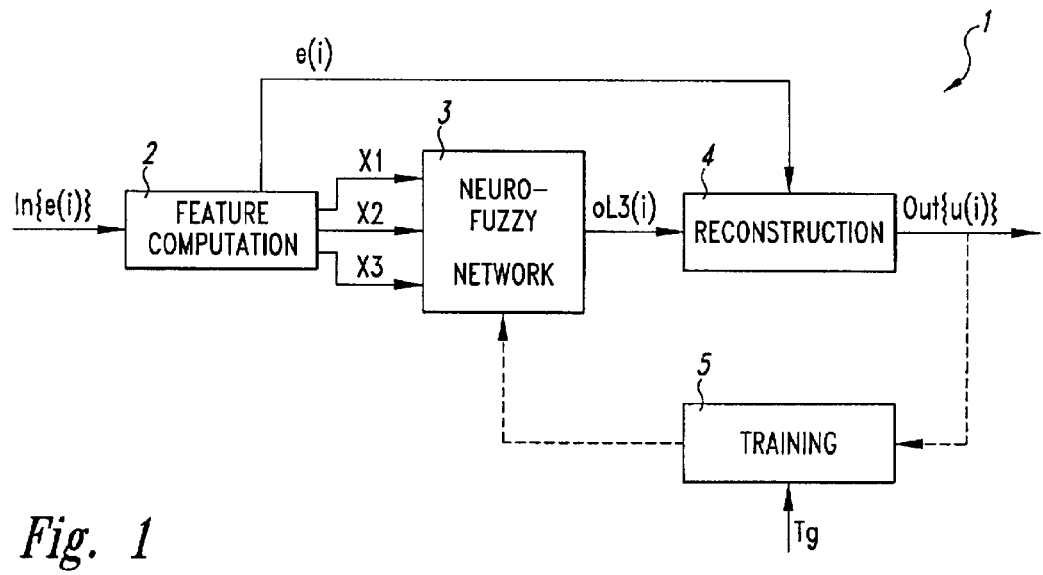
FIG. 1 is a block diagram showing the general architecture of the filter according to the invention.

FIG. 1 shows a filter 1 comprising a signal-feature computation unit 2, a neuro-fuzzy network 3, a reconstruction unit 4, and a training unit 5.

The signal-feature computation unit 2 receives at the input a signal In including of a plurality of input samples e(i), stores, at each clock cycle, (2N+1) input samples e(i) (which represent a work window for filter 1) in an internal buffer, computes the signal features X1(i), X2(i), and X3(i) for each input sample e(i) on the basis of all the input samples belonging to the work window (as described in detail hereinafter), and supplies the signal features X1(i), X2(i), and X3(i) thus calculated to the neuro-fuzzy network 3.

The neuro-fuzzy network 3 processes the signal features X1(i), X2(i), and X3(i) and generates at the output a reconstruction weight oL3(i) for each input sample e(i). To this aim, starting from the signal features X1(i), X2(i), and X3(i) and for each input sample e(i), the neuro-fuzzy network 3 first performs a fuzzification operation, then applies preset fuzzy rules, and finally carries out a defuzzification operation. The reconstruction weight oL3(i) thus obtained is hence the weighted sum of all the input samples e(i) in the same work window, as explained in detail hereinafter with reference to FIGS. 2 and 3.

The reconstruction unit 4 receives the reconstruction weights oL3(i) and the input samples e(i) and, after accumulating a sufficient number of input samples e(i) and of corresponding reconstruction weights oL3(i), generates an output sample u(i) the sequence of which forms an output signal Out.

The training unit 5 is operative only initially, so as to train the neuro-fuzzy network 3 and modify the weights of the network with the aim of obtaining an optimal behavior of the filter 1, as described in detail hereinafter.

The signal features X1 (i), X2(i), and X3(i), computed in the signal-feature computation unit 2, are correlated, respectively, to the distance between each sample and the central sample of the considered window, to the difference between a given sample and the sample at the center of the window, and to the difference between a given sample and the average of samples in the window, and are normalized so as to obtain values between 0 and 1.

In detail, given a window of (2N+1) input samples e(i), with i=0, ..., 2N, the signal features X1(i), X2(i), and X3(i) for each input sample e(i) are defined as $$X1(i) = \frac{|i - N|}{N} \quad (1)$$

$$X2(i) = \frac{|e(i) - e(N)|}{\max(\text{diff})} \quad (2)$$

$$X3(i) = \frac{|e(i) - av|}{\max(\text{diff\_av})} \quad (3)$$

where N is the position of a central sample e(N) in the work window;

max (diff)=max (e(k)−e(N)) with k=0, ..., 2N, i.e., the maximum of the differences between all the input samples e(k) and the central sample e(N);

av is the average value of the input samples e(i); and max (diff_av)=max (e(k)−av) with k=0, ..., 2N, i.e., the maximum of the differences between all the input samples e(k) and the average value av.

Figure 2:
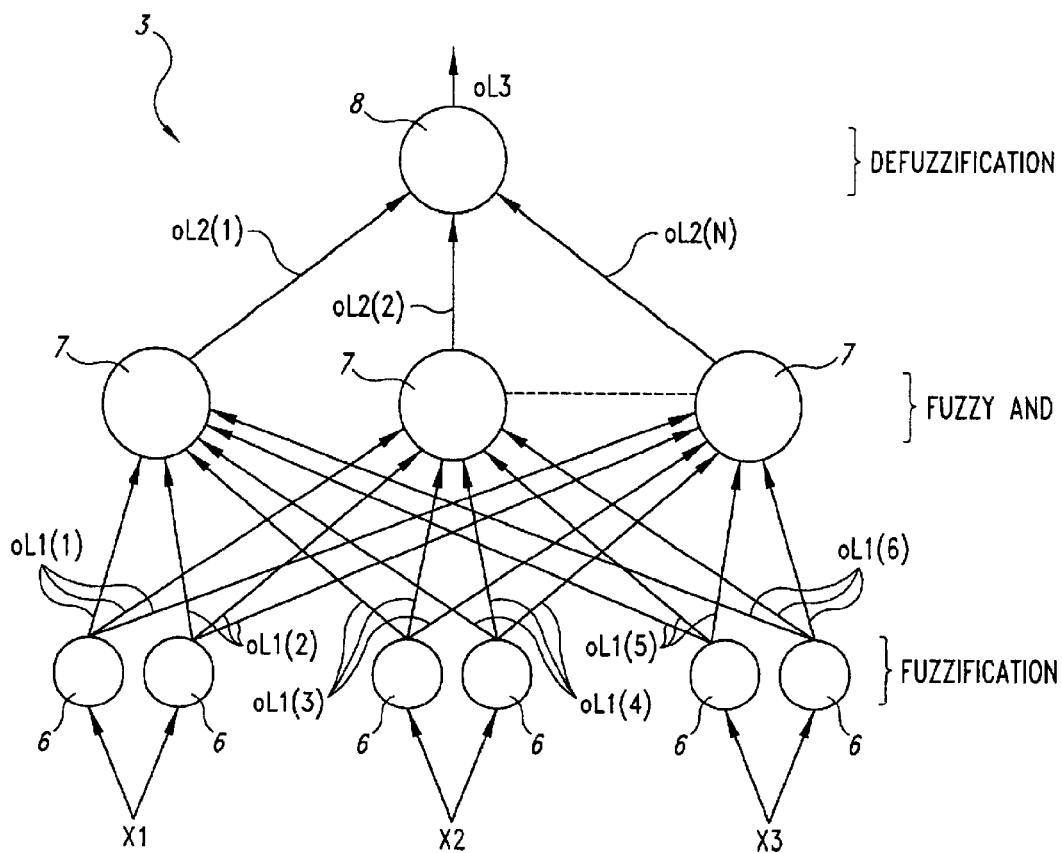
FIG. 2 represents the topology of a block of FIG. 1 for a neuro-fuzzy network.

The neuro-fuzzy network 3 is a three-layer fuzzy network the functional representation of which appears in FIG. 2, in which, for reasons of simplicity, the index i in parenthesis for the specific sample within the respective work window is not indicated. Nevertheless, as mentioned above, and as will emerge more clearly from the flowchart of FIGS. 3A, 3B, the neuro-fuzzy processing represented by FIG. 2 is repeated for each input sample e(i).

In detail, starting from the three signal features X1, X2 and X3 (or generically from l signal features Xl) and given k membership functions of a gaussian type for each signal feature (described by the average value $W_m(l, k)$ and by the variance $W_v(l, k)$, a fuzzification operation is performed in which the membership level of the signal features X1, X2 and X3 is evaluated with respect to each membership function (here two for each signal feature, so that k=2; in all there are M=1×k=6 membership functions).

In FIG. 2, the above operation is represented by six first-layer neurons 6, each of which, starting from the three signal features X1, X2 and X3 (generically designated by Xl) and using as weights the average value $W_m(l, k)$ and the variance $W_v(l, k)$ of the membership functions, supplies a first-layer output oL1(l,k) (hereinafter also designated by oL1(m)) calculated as follows:

$$oL1(l, k) = oL1(m) = \exp\left(-\left(\frac{Xl - W_m(l, k)}{W_v(l, k)}\right)^2\right). \quad (4)$$

Hereinafter, a fuzzy AND operation is performed, using the norm of the minimum, in such a way as to obtain N second-layer outputs oL2(n). For example, N is equal to 6. As is known, a fuzzy AND operation using the norm of the minimum is based upon rules of the type:

if $X_1^{(1)}$ is $A_1^{(1)}$ and $X_2^{(1)}$ is $A_2^{(1)}$ and $X_3^{(1)}$ is $A_3^{(1)}$ then O is $B_1^{(1)}$

...

if $X_1^{(n)}$ is $A_1^{(n)}$ and $X_2^{(n)}$ is $A_2^{(n)}$ and $X_3^{(n)}$ is $A_3^{(n)}$ then O is $B_1^{(n)}$ in which $A_1^{(1)}, A_2^{(1)}, \ldots, B_1^{(1)}$ etc. are linguistic terms, such as "high" and "low," and the value of the output O for each rule is given by the minimum of the membership levels multiplied by a weight.

In practice, with the neuro-fuzzy network of FIG. 2, each second-layer output oL2(n) is equal to the minimum one among the products of the M outputs of oL1(m) of the first-layer neurons 6 and a respective second-layer weight $W_{FA}(m, n)$.

In FIG. 2 the above operation is represented by N second-layer neurons 7 which implement the equation $$oL2(n) = \min_n \{W_{FA}(m, n) \cdot oL1(m)\}. \quad (5)$$

Finally, the third layer corresponds to a defuzzification operation and supplies at output a discrete-type reconstruction weight oL3, using N third-layer weights $W_{DF}(n)$. The defuzzification method is that of the center of gravity (centroid) and is represented in FIG. 2 by a third-layer neuron 8 supplying the reconstruction weight oL3 according to the equation $$oL3 = \frac{\sum_{n=1}^{N} W_{DF}(n) \cdot oL2(n)}{\sum_{n=1}^{N} oL2(n)}. \tag{6}$$

The reconstruction unit 4 then awaits a sufficient number of samples e(i) and corresponding reconstruction weights oL3(i) (at least 2N+1, corresponding to the width of a work window) and calculates an output sample u(i) as the weighted sum of the input samples e(i−j), with j=0 . . . 2N, using the reconstruction weights oL3(i−j), according to the equation $$u(i) = \frac{\sum_{j=0}^{2N} oL3(i-j) \cdot e(i-j)}{\sum_{j=0}^{2N} e(i-j)}. \tag{7}$$

The training unit 5 operates only in an initial learning stage, when an input signal In having a known configuration is supplied to the filter 1, the output signal Out obtained is compared with a target signal Tg, and the distance between the obtained signal Out and the target signal Tg is evaluated on the basis of a fitness function. This fitness function may be, for example, the quadratic signal/noise ratio having the following expression:

$$SNR = \sum_{i=1}^{T} \frac{(Tg(i))^2}{(e(i)-Tg(i))^2} \tag{8}$$

in which T is the total number of input samples e(i).

Using the fitness function and applying a method for function optimization, such as the gradient-descent method, a genetic algorithm, the simulated-annealing method, and random search, the first-layer weights (mean value $W_m(l, k)$ and variance $W_v(l, k)$ of the gaussian membership functions) and the third-layer weights $W_{DF}(n)$ are modified, and a new fitness evaluation is performed. The second-layer weights $W_{F4}(m, n)$ are instead randomly initialized and are not modified. The learning process is iterated until a preset value of the fitness function is achieved or until a preset number of genetic algorithms have been generated or a preset number of steps of the selected optimization algorithm has been performed.

In this way, the neuro-fuzzy network 3 implements an adaptive algorithm and overcomes the limitations of neural networks or of fuzzy systems considered separately. In fact, fuzzy systems do not have learning capabilities and, if the selection of the fuzzy rules is not accurate, the fuzzy algorithm does not behave satisfactorily. Instead, using the neuro-fuzzy network 3 and carrying out a prior learning step it is possible to approach a signal having a complex mathematical structure, for example the voice in a noisy environment, without any prior knowledge of the mathematical laws governing the said system.

Figure 3A:
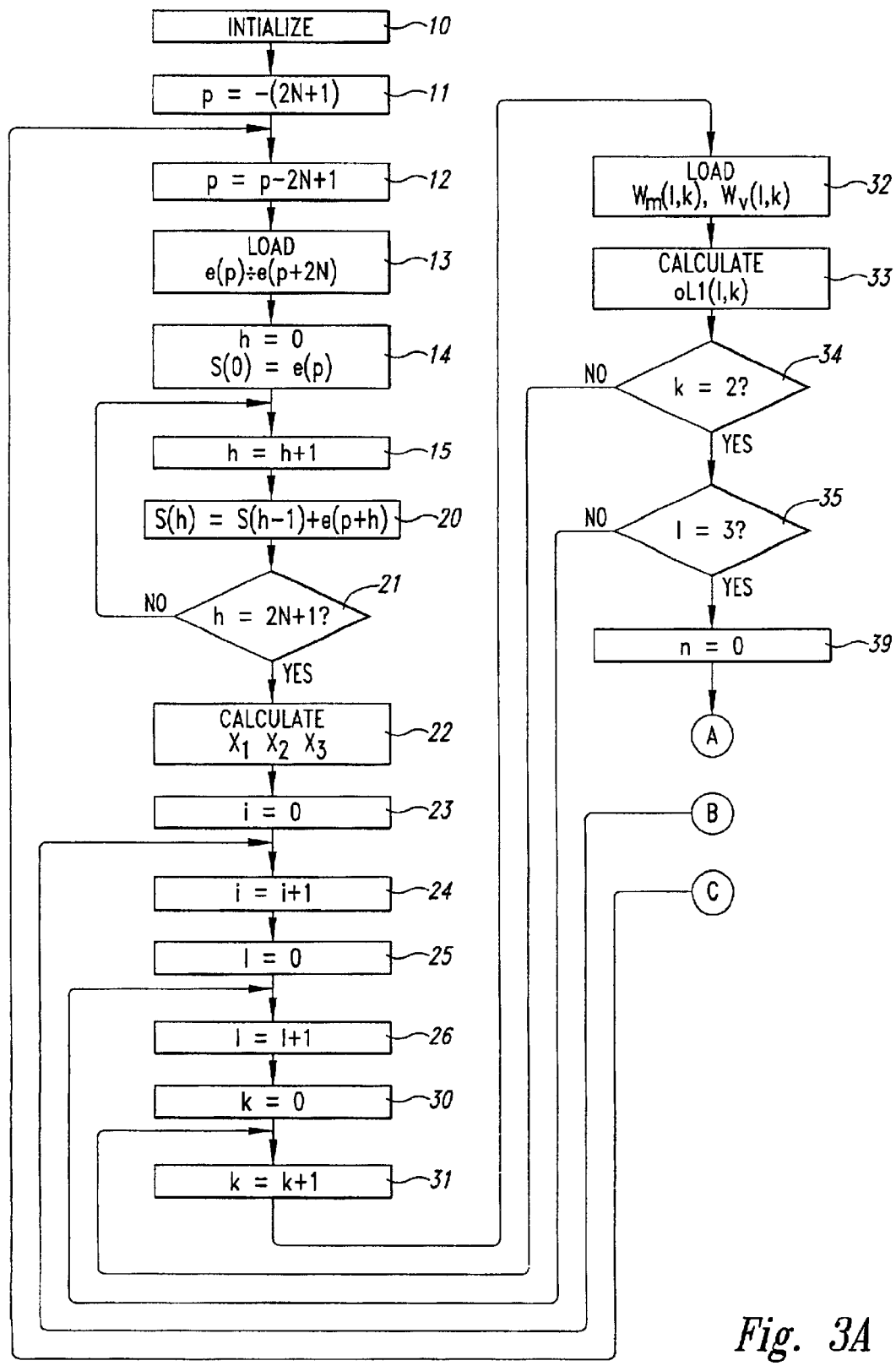
FIGS. 3A and 3B show a flowchart of the operations performed by the filter of FIG. 1.
Figure 3B:
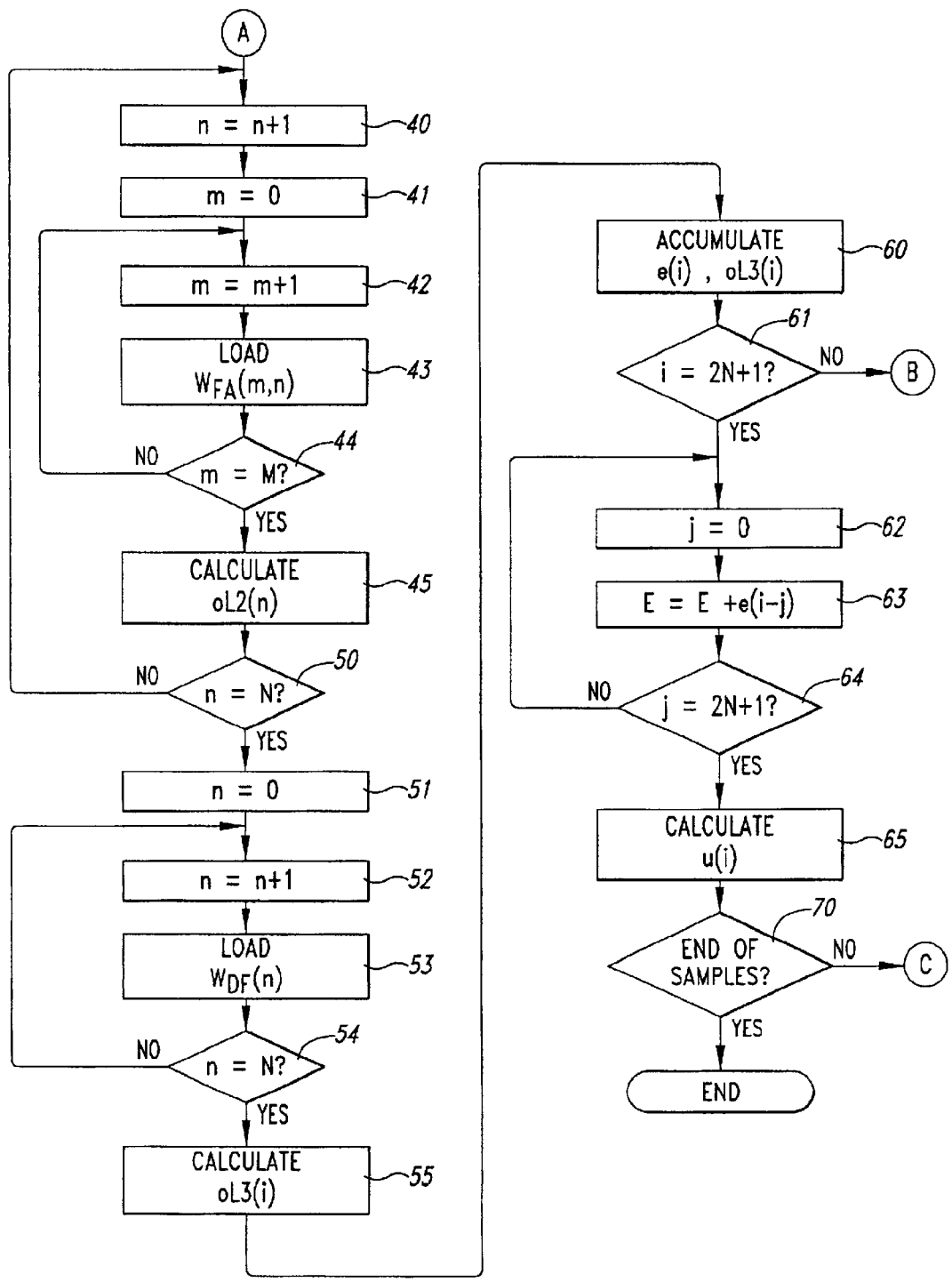

Operation of the filter 1 of FIG. 1 is described in detail hereinafter with reference to FIGS. 3A and 3B.

Initially, the filter 1 is initialized, step 10, as is a window counter p, step 11. Then the window counter p is incremented by (2N+1), equal to the number of input samples e(i) in a work window, step 12, and the input samples of a work window ranging between e(p) and e(p+2N) are loaded, step 13. A sum-of-samples counter h is initialized at 0, and a sum-of-samples variable S(0) is initialized with the value of the input sample e(p), step 14. Next, the sum-of-samples counter h is incremented by one unit, step 15, and the sum-of-samples variable S(h) is incremented with the value of a sample e(p+h), step 20. After the sum of (2N+1) input samples (output YES from step 21), the sum-of-samples variable S(h) is equal to the sum of all the input samples e(i) and may be directly used for calculating the signal features.

Subsequently, using equations (1), (2) and (3) and the value of the sum-of-samples variable S(h), the signal features X1, X2, X3 are calculated for each sample e(p)−e(p+2N) belonging to the considered work window, step 22. A sample counter i for the input samples within the considered work window is then reset to zero, step 23, and subsequently incremented by one unit, step 24; a feature counter 1 for the number of signal features used (in the present case, 3) is reset to zero, step 25, and subsequently incremented, step 26; and a function counter k for the number of membership functions used for each signal feature (in the present case, 2) is reset to zero, step 30, and subsequently incremented, step 31. Next, the first-layer weights (the mean value $W_m(l, k)$ and the variance $W_v(l, k)$) are loaded, step 32, and the first-layer outputs oL1(l, k) are calculated in accordance with equation (4), step 33.

Loading of the first-layer weights $W_m(l, k)$, $W_v(l, k)$ and calculation of the first-layer outputs oL1(l, k) are repeated for all the membership functions (output YES from step 34) and for all the signal features (output YES from step 35).

Next, a second-layer neuron counter n is reset to zero, step 39, and incremented by one unit, step 40; an algorithm counter m is reset to zero, step 41, and incremented, step 42; and the second-layer weights $W_{F4}(m, n)$ for the n-th second-layer neuron 7 are loaded, steps 43, 44. Then, the second-layer output oL2(n) for the n-th second-layer neuron 7 is calculated using equation (5), step 45, and the procedure of steps 40–45 is repeated for all the n second-layer neurons 7.

At the end (output YES from step 50), the second-layer neuron counter n is reset again, step 51, and incremented by one unit, step 52; all the third-layer weights $W_{DF}(n)$ are loaded in succession, steps 53, 54; at the end of loading (output YES from step 54) the reconstruction weight oL3(i) is calculated in accordance with equation (6), step 55.

The reconstruction weights oL3(i) thus calculated and the respective input samples e(i) are stored, step 60, and the procedure described for steps 24–60 is repeated for successive input samples e(i) until (2N+1) input samples e(i) are reached (output YES from step 61).

Next, a sum counter j is reset to zero, step 62, and the input sample e(i) is added to the previous 2N input samples e(i−j), and the sum is stored in a variable E, step 63.

After the sum of (2N+1) input samples has been carried out, an output sample u(i) is calculated in accordance with equation 7, step 65.

The entire cycle described by steps 12–65 is repeated as long as input samples e(i) are present; at the end (output YES from step 70), the sample processing procedure terminates.

According to another aspect of the invention, filtering is based on a multi-resolution analysis obtained through a filter bank in phase quadrature. Wavelet theory furnishes the theoretical basis for multi-resolution.

As is known, a multi-resolution analysis defines a set of nested subspaces of a square summable function space, i. e., the space of the finite-energy functions, widely known in physics and electrical engineering. On the basis of the above analysis, a projection of a function in one of these subspaces isolates the "roughest" details of the function, whilst projection of the function in the orthonormal complement of this subspace isolates the "finer" details of the function. The procedure may be iterated to obtain a pyramid. From wavelet theory it is known that the operation may be performed using a bank of FIR filters, in which each FIR filter is followed by a subsampler). The signal thus split into subbands can be reconstructed using a bank of complementary filters, each of which is provided with a sample incrementer (upsampler).

Figure 4:
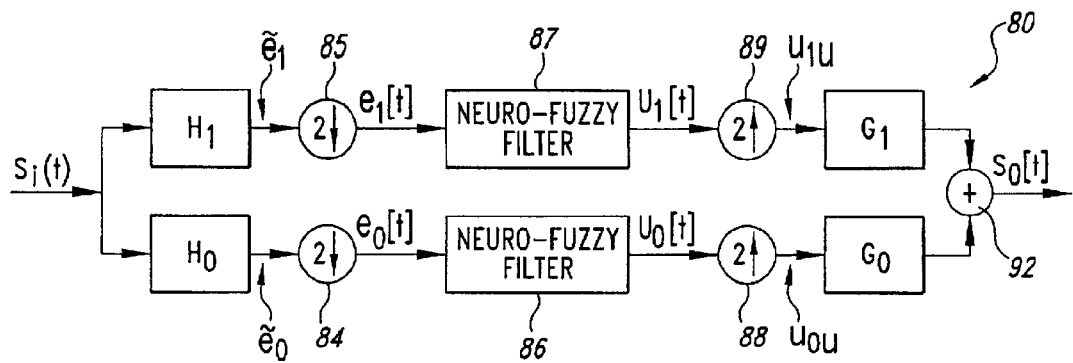
FIG. 4 shows a block diagram of a filtering device using the filter of FIG. 1.

A first embodiment of the above-mentioned solution is shown in FIG. 4 and regards a multi-resolution filter 80 generating two subspaces and using a first pair of Finite Impulse Response Quadrature Mirror Filters (FIR QMFs) for the analysis and a second pair of FIR QMFs for the synthesis.

In detail, the multi-resolution filter 80 receives, on an input 81, an input signal $s_1(t)$. The input signal $s_1(t)$ is supplied to two input FIR filters $H_0$, $H_1$ which perform a convolution operation so to output a corresponding filtered signal $\tilde{e}_0$, $\tilde{e}_1$ equal to:

$$\tilde{e}_0(t) = \sum_{r=0}^{M} h_0(r) \cdot i(t-r) \qquad (9)$$

$$\tilde{e}_1(t) = \sum_{r=0}^{M} h_1(r) \cdot i(t-r) \qquad (10)$$

in which M is the order of the filters $H_0$, $H_1$; $\tilde{e}_0(t)$, $\tilde{e}_1(t)$ is the t-th sample of the respective output sequence; $s_1(t)$ is the t-th sample of the input sequence; $h_0(r)$, $h_1(r)$ is the t-th tap of the input FIR filter $H_0$, $H_1$, in which $$h_1(r) = (-1)^{r-1} h_0(2I - r + 1)$$

where I is an integer.

Figure 5:
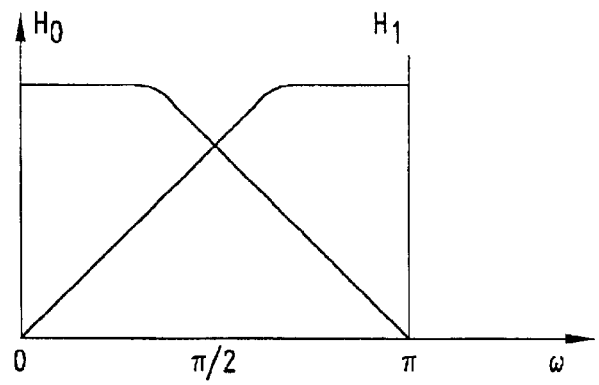
FIG. 5 shows the transfer functions of digital filters belonging to the filtering device of FIG. 4.
Figure 6:
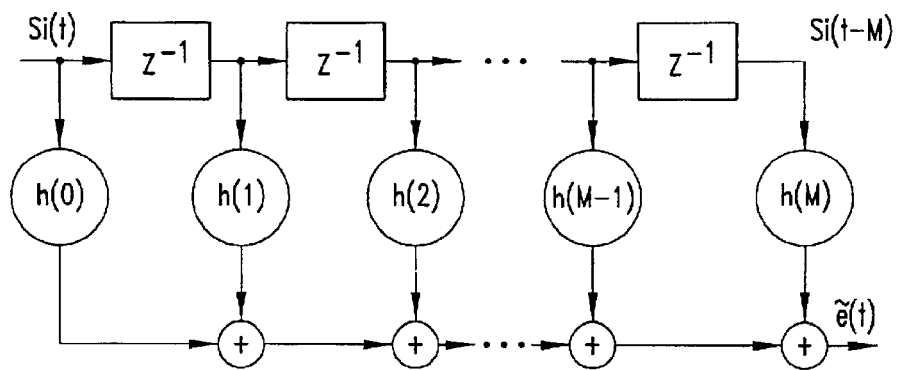
FIG. 6 shows the block diagram of some digital filters belonging to the filtering device of FIG. 4.

The input FIR filters $H_0$, $H_1$ have transfer functions shown in FIG. 5 and thus define, respectively, a low-pass filter and a high-pass filter, and have the structure shown in FIG. 6, where the generic tap h(r) corresponds to $h_0(r)$ or to $h_1(r)$, according to whether it is the input FIR filter $H_0$ or the input FIR filter $H_1$.

The outputs of the input FIR filters $H_0$, $H_1$ are each connected to a respective subsampling unit 84, 85 which discards the odd samples from the input signal $\tilde{e}_0(t)$, $\tilde{e}_1(t)$ and retains only the even samples, generating a respective signal $e_0(t)$, $e_1(t)$. The outputs of the subsampling units 84, 85 are each connected to a respective neuro-fuzzy filter 86, 87. Both of the neuro-fuzzy filters 86, 87 have the structure shown in FIG. 1.

The output signals $u_0(t)$, $u_1(t)$ of the neuro-fuzzy filters 86, 87 are each supplied to a respective upsampler 88, 89 which generates a respective output signal $u_{0u}(t)$, $u_{1u}(t)$ by entering a zero sample between each pair of samples of the respective output signal $u_0(t)$, $u_1(t)$ of the neuro-fuzzy filters 86, 87. The outputs of the of the upsampling units 88, 89 are each connected to a respective output FIR filter $G_0$, $G_1$. These filters too have each a respective transfer function given by equation (9) and equation (10), respectively.

Finally, the output signals of the output FIR filters $G_0$, $G_1$ are added together, sample by sample, by an adder 92.

Figure 7:
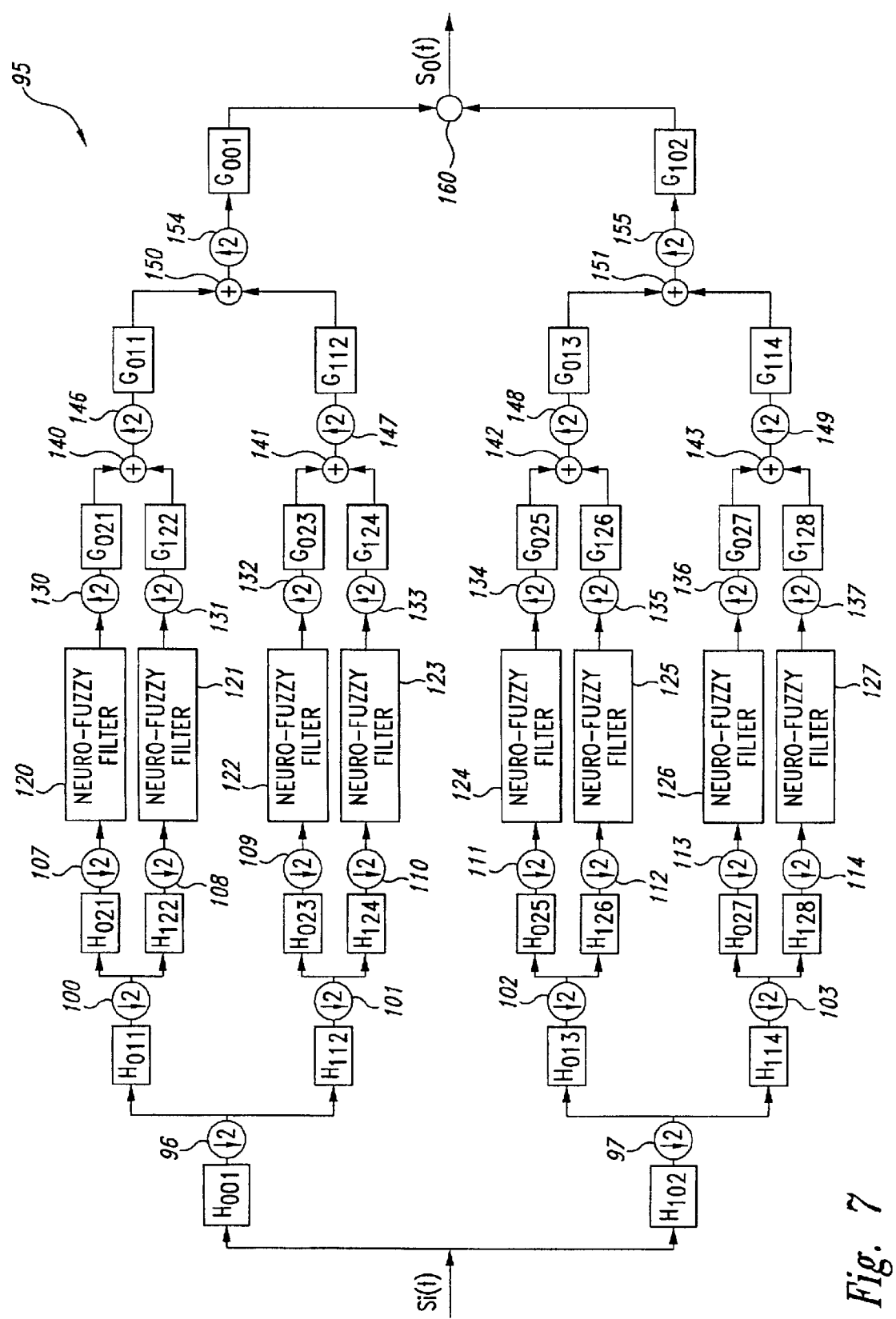
FIG. 7 shows a block diagram of another filtering device using the filter of FIG. 1.

FIG. 7 shows a multi-resolution filter 95 using eight subspaces. In detail, the input signal $s_1(t)$ is initially supplied to two first synthesis FIR filters $H_{001}$, $H_{102}$, respectively of the low-pass type and of the high-pass type, and is then subsampled in two first subsampling units 96, 97, in a similar way as described for the units 85, 86 of FIG. 4. The sequences of samples thus obtained are each supplied to two synthesis filters (and hence altogether to four second synthesis FIR filters $H_{011}$, $H_{112}$, $H_{013}$, and $H_{114}$). The outputs of the second synthesis FIR filters $H_{011}$, $H_{112}$, $H_{113}$, and $H_{114}$ are then supplied to four second subsampling units 100–103, and each sequence thus obtained is supplied to two third synthesis FIR filters (and hence altogether to eight third synthesis FIR filters $H_{021}$, $H_{122}$, $H_{023}$, $H_{124}$, $H_{025}$, $H_{126}$, $H_{027}$, $H_{128}$), generating eight sequences of samples. The eight sample sequences are then supplied to eight third subsampling units 107–114 and processed in respective neuro-fuzzy filters 120–127 having the structure illustrated in FIG. 1. The sample sequences present on the outputs of the neuro-fuzzy filters 120–127 are then incremented via upsampling units 130–137 and supplied to respective first synthesis FIR filters $G_{021}$, $G_{122}$, $G_{023}$, $G_{124}$, $G_{025}$, $G_{126}$, $G_{027}$, and $G_{128}$. The sample sequences thus obtained are added up two by two through four adders 140–143 (with a reverse process with respect to the one followed downstream of the second subsampling units 100–103), supplied to four upsampling units 146–149, and filtered again through four second synthesis FIR filters $G_{011}$, $G_{112}$, $G_{013}$, and $G_{114}$.

The sample sequences thus obtained are added up two by two through two adders 150, 151 (according to a reverse process with respect to the one followed downstream of the first subsampling units 96, 97), incremented by two upsampling units 154, 155, filtered through two third synthesis FIR filters $G_{001}$, and $G_{102}$, and finally summed in an adder 160 so as to supply the output signal $s_0(t)$.

Figure 8:
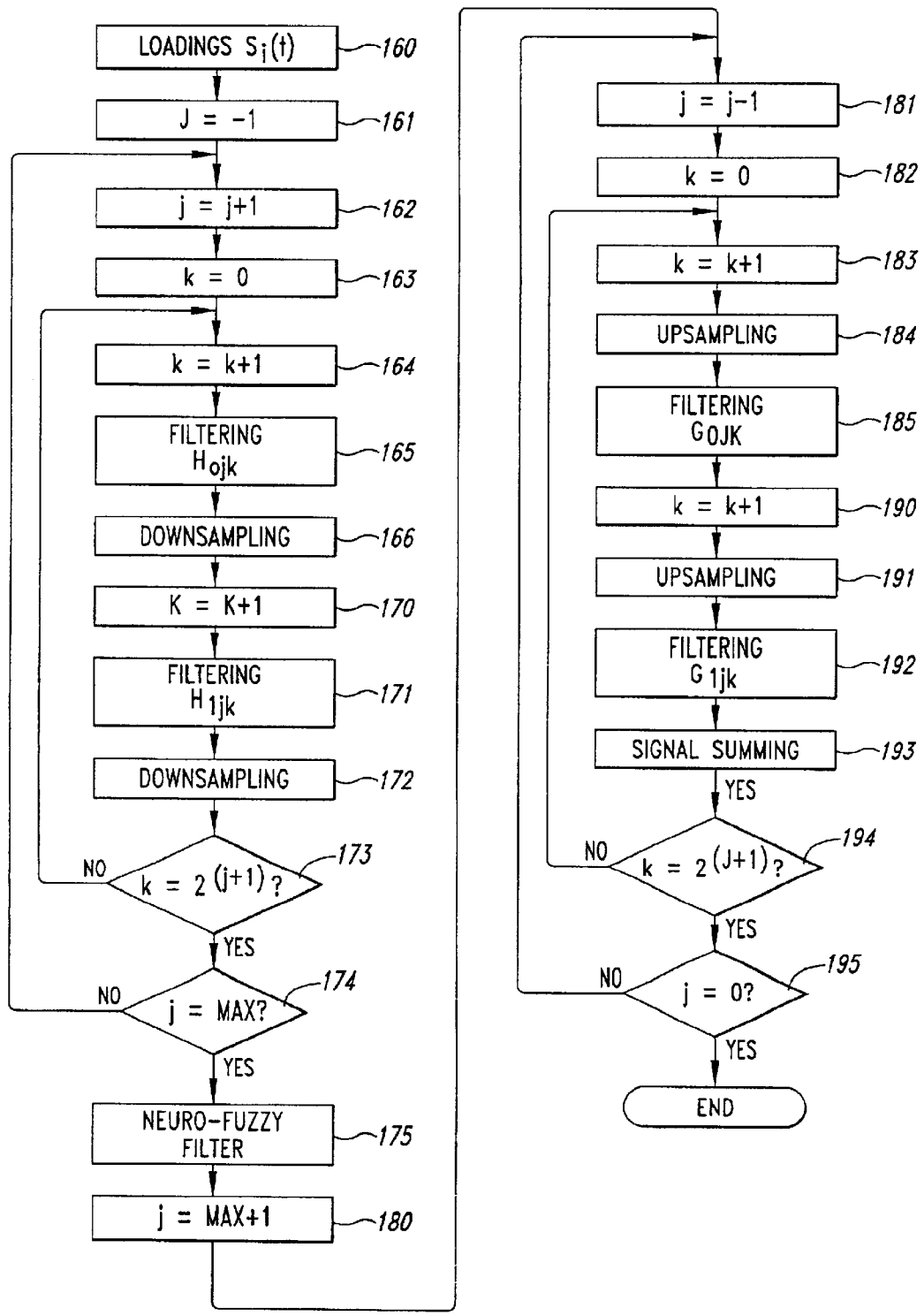
FIG. 8 shows a flowchart of the operation of the filtering device of FIG. 7.

FIG. 8 shows a flowchart of the sequence of steps performed using a multi-resolution filter with a preset arbitrary number of splittings into subspaces.

Initially, the samples of the input signal $s_1(t)$ are loaded, step 160; then a space split counter j is initialized at −1, step 161, and incremented by one unit, step 162; a subspace counter k is initialized at zero, step 163, and incremented by one unit, step 164. Then the samples of the input signal $s_1(t)$ are filtered using the filter $H_{0jk}$ (thus, at the first iteration, using the filter $H_{001}$), step 165, and the filtered samples are downsampled, step 166. Next, the subspace counter k is incremented, step 170; the samples of the input signal $s_1(t)$ are filtered using the filter $H_{1jk}$ (thus, at the first iteration, using the filter $H_{102}$), step 171, and the filtered samples are downsampled, step 172.

It is checked whether the subspace counter k is equal to $2^{(j+1)}$; if it is not, the cycle comprising steps 164–172 is repeated (in the iterations following on the first, filtering is performed on the samples obtained in the previous iteration with the filter $H_{0(j-1)(k-2)}$ or $H_{1(j-1)(k-2)}$); if it is (output YES from step 173), it is checked whether the splitting into subspaces is terminated (i.e., whether the space split counter j has reached the preset maximum), step 174. If it has not, the procedure returns to step 162; if it has, all the obtained sample sequences are filtered using the neuro-fuzzy filter of FIG. 1, step 175.

Next, the space split counter j is initialized at its maximum value plus one unit, step 180, and then decreased by one unit, step 181, the subspace counter k is initialized at zero, step 182, and incremented by one unit, step 183. Next, the first sample sequence at output of the first neuro-fuzzy filter (120, in FIG. 7) is upsampled, step 184, and filtered using a filter $G_{0jk}$ (thus, at the first iteration, using the filter $G_{021}$), step 185. Then, the subspace counter k is incremented again, step 190; a second sample sequence at the output of a second neuro-fuzzy filter (121, in FIG. 7) is upsampled, step 191, and filtered using a filter $G_{1jk}$ (thus, at the first iteration, using the filter $G_{121}$), step 192. The samples at the output of the filters $G_{0jk}$ and $G_{1jk}$ are then summed, step 193.

It is then checked whether the subspace counter k is equal to $2^{(j+1)}$, step 194; if it is not, the cycle comprising steps 183–193 is repeated (processing the sample sequences at the output of the subsequent neuro-fuzzy filters); if it is (output YES from step 194), it is checked whether the end has been reached, step 195; if it has not, the procedure returns to step 181, decreasing the space split counter j and processing the sample sequences previously upsampled, filtered and summed. The loop defined by steps 181–194 is repeated until a single sequence of samples is obtained, corresponding to the output signal $s_0(t)$, output YES from step 195.

Figure 9:
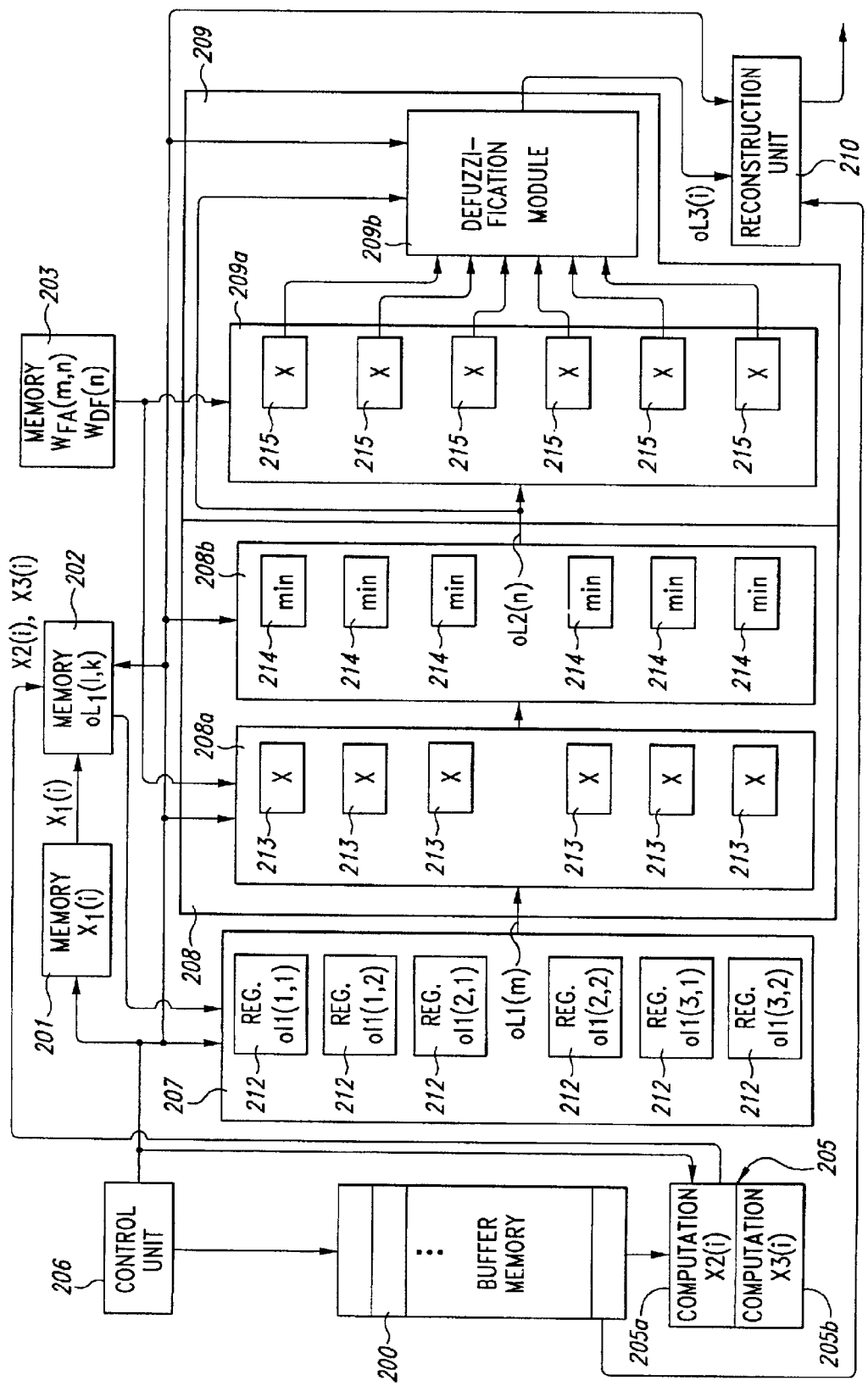
FIG. 9 shows a block diagram for the hardware implementation of the filter of FIG. 1.

FIG. 9 shows the hardware implementation of the neuro-fuzzy filter 1 of FIG. 1. In detail, the neuro-fuzzy filter 1 comprises a data memory 200, three work memories 201–203, a signal features calculation module 205, a control unit 206, a first-layer output memory unit 207, a second-layer output calculating unit 208, a reconstruction-weight calculating unit 209, and a reconstruction unit 210.

The data memory 200 stores the (2N+1) samples e(i) of each work window and comprises (2N+1) registers, each having 16 bits.

The work memories 201–203 are nonvolatile memories, for example ROM, PROM, EPROM, EEPROM or flash memories.

In particular, the first work memory 201 stores the first signal feature X1(i) and comprises (2N+1) sixteen-bit memory locations. Since the value of the first signal feature X1(i) for the i-th sample is constant in the various sample windows, as is evident from equation (1), the contents of the first work memory 201 must not be modified during the learning step or during operation of the neuro-fuzzy filter 1, and the first work memory 201 may be implemented using any one of the technologies referred to above.

The second work memory 202 stores the values of the two gaussian curves described by equation (2) according to the values of the signal features X1, X2, and X3. Since the values of these gaussian curves depend upon the second-layer weights $W_m(l, k)$, $W_v(l, k)$, when a learning step is provided, the second work memory 202 must be of the programmable type, for example of the EPROM, EEPROM or flash type. To avoid the use of a memory of excessive size, the gaussian functions (which represent the membership functions of the signal features X1, X2, X3, as discussed above) are stored as discrete values, according to the desired level of accuracy. For example, if the membership functions have 256 values, with an accuracy of 16 bits per value, considering two sets of fuzzy rules for each signal feature X1, X2, and X3, the second work memory 202 must have a storage capacity of 256×16×6 bits. The second work memory 202 is then addressed starting from the current values (corresponding to the i-th sample) of the signal features X1, X2, X3 supplied by the first work memory 201 and by the signal features calculation module 205, and outputs (to the first-layer output memory unit 207) the values of the six first-layer outputs oL1(m).

The third work memory 203 stores the second-layer weights $W_{FA}(m, n)$ and the third-layer weights $W_{DF}(n)$. Since the third-layer weights $W_{DF}(n)$ are generally modified during the learning step, the third work memory 203 is of a programmable type, as is the second work memory 202. In detail, if there are M×N second-layer weights $W_{FA}(m, n)$ and N third-layer weights $W_{DF}(n)$, the work memory 203 comprises (16×M×N+16×N) bits.

The signal features calculation module 205 comprises a hardware network (not shown) represented as divided into a first part 205*a* for calculating the second signal feature X2(i) and a second part 205*b* for calculating the third signal feature X2(i). In the signal features calculation module 205 the operations represented by equations (2) and (3) are performed, and this module comprises a sample memory (having 2N+1 locations), a unit for calculating the average value av, a unit for calculating the maximum of the differences between all the input samples and the central sample max(diff), a unit for calculating the maximum of the differences between all the input samples and the average value max(diff_av), and a unit for calculating the fractions defined by equations (2) and (3).

The first-layer output memory unit 207 comprises six registers 212 which store the first-layer outputs oL1(m) supplied by the second work memory 202.

The second-layer output calculating unit 208 comprises two modules, namely, a first multiplication module 208*a* and a minimum module 208*b*. In detail, the first multiplication module 208*a* includes six first multiplication units 213 each of which multiplies a respective first-layer output oL1(m) (supplied by the first-layer output memory unit 207) by n respective second-layer weights $W_{FA}(m, n)$ (supplied by the second work memory 203); the second multiplication module 208*b* includes six minimum units 214 which, starting from the six respective products oL1(m)×$W_{FA}(m, n)$, calculate the minimum thereof, supplying at the output a respective second-layer output oL2(n).

The reconstruction-weight calculating unit 209 comprises two modules, namely, a second multiplication module 209*a* and a defuzzification module 209*b*. In detail, the second multiplication module 209*a* includes six second multiplication units 215 which multiply a respective second-layer output oL2(n), supplied by the second-layer output calculating unit 208, by a respective third-layer weight $W_{DF}(n)$, supplied by the third work memory 203. The defuzzification module 209*b* calculates the reconstruction weights oL3, adding the products supplied by the second multiplication module 209*a*, adding together the second-layer outputs oL2(n), and calculating the ratio between the two sums in accordance with equation (6).

The reconstruction unit 210 stores the reconstruction weights oL3(i) as these are supplied by the reconstruction-weight calculating unit 209 and, as soon as it has stored 2N+1 reconstruction weights oL3, it calculates the output sample u(2N+1) in accordance with equation (7), also using the values of the 2N+1 samples supplied by the data memory 200. Subsequently, upon receipt of the next reconstruction weight oL3(2N+2), it calculates the output sample u(2N+2) using also the previous 2N reconstruction weights oL3 and as many samples coming from the data memory 200, in accordance with equation (7).

The control unit 206 determines the processing sequence and data loading/transfer between the various units and modules. To calculate a single output sample, the control unit repeats the sequence of steps of the fuzzy algorithm 2N+1 times, updates the data memory 200 at the end of 2N+1 cycles, and controls loading of successive 2N+1 samples.

Figure 10A:
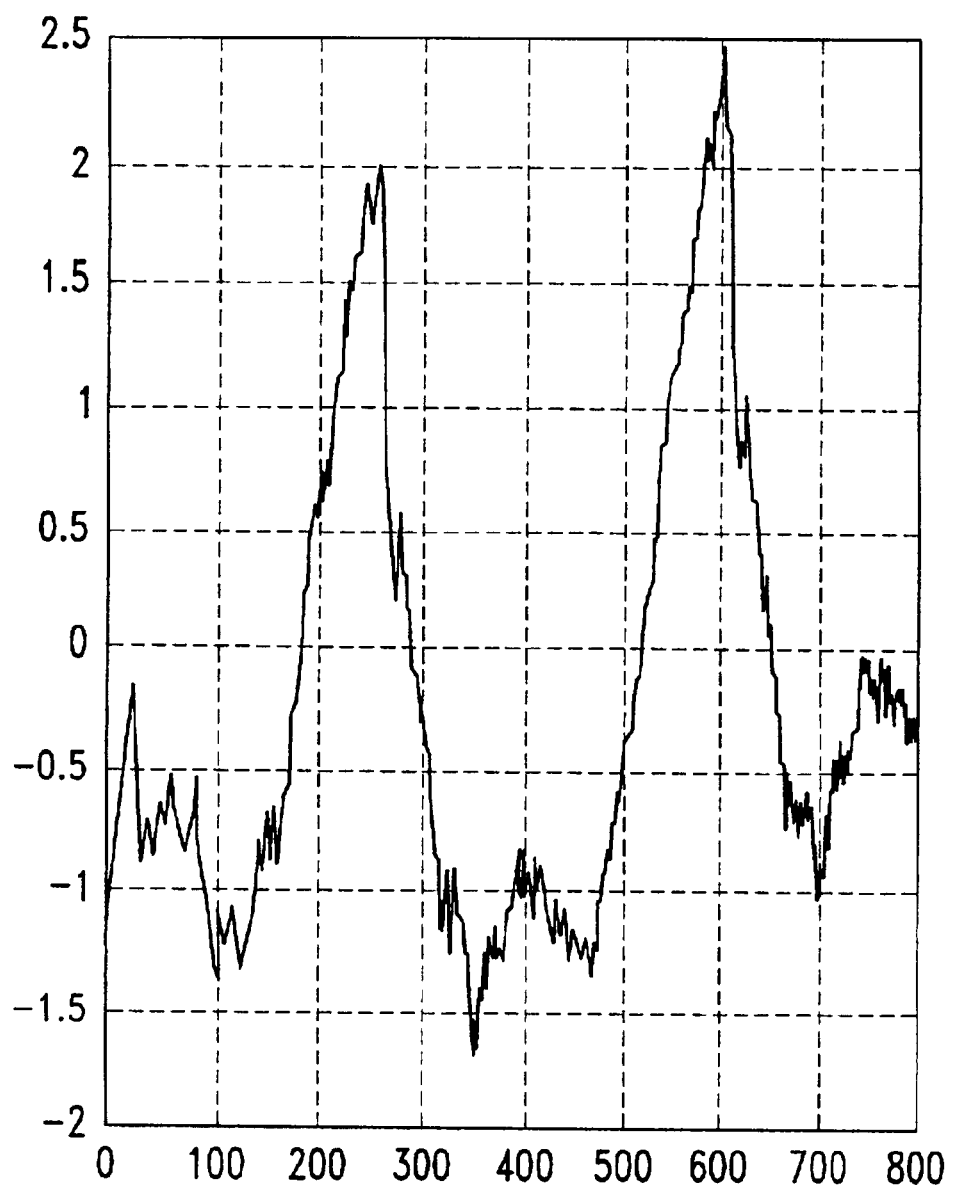
FIGS. 10A, 10B, and 10C respectively show a voice signal free from noise, the same signal superimposed on white noise, and the same signal after filtering according to the invention.
Figure 10B:
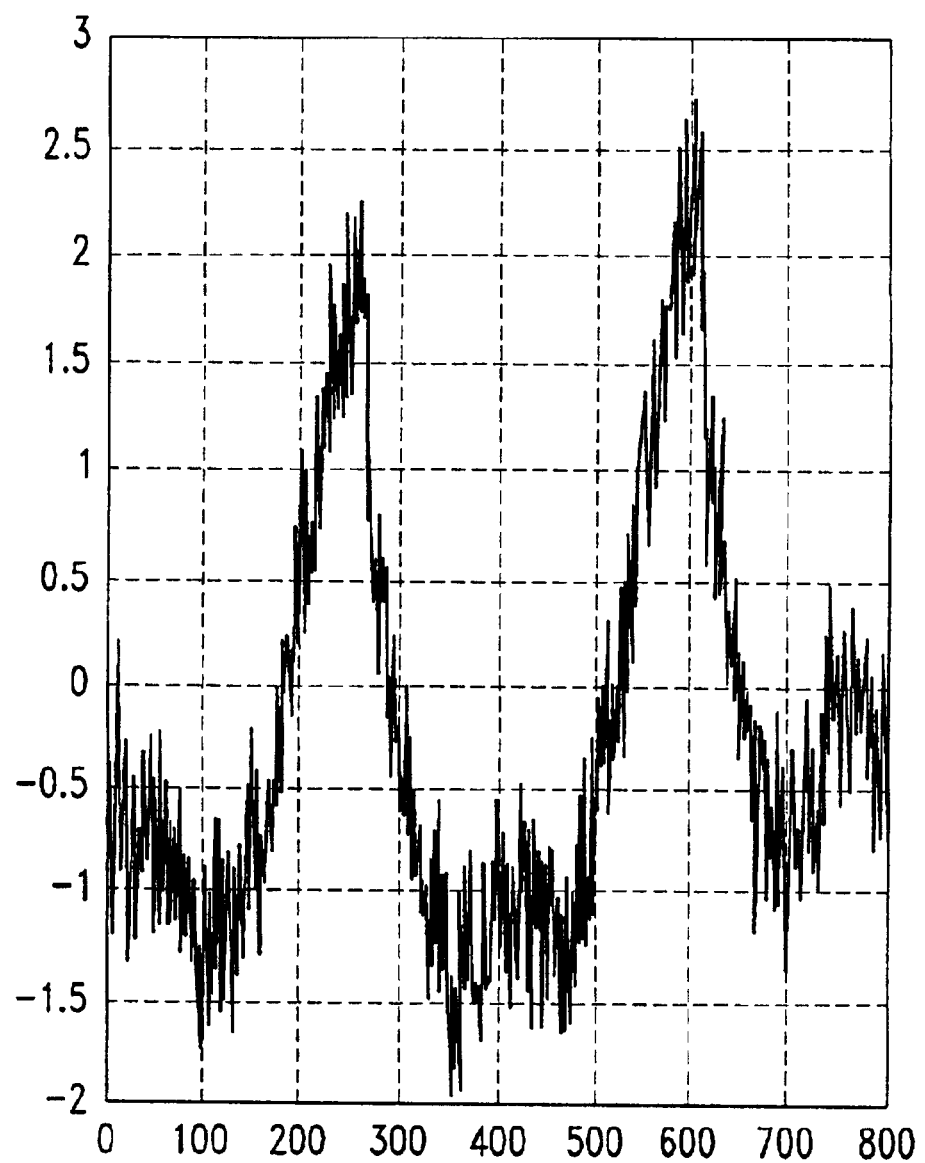
Figure 10C:
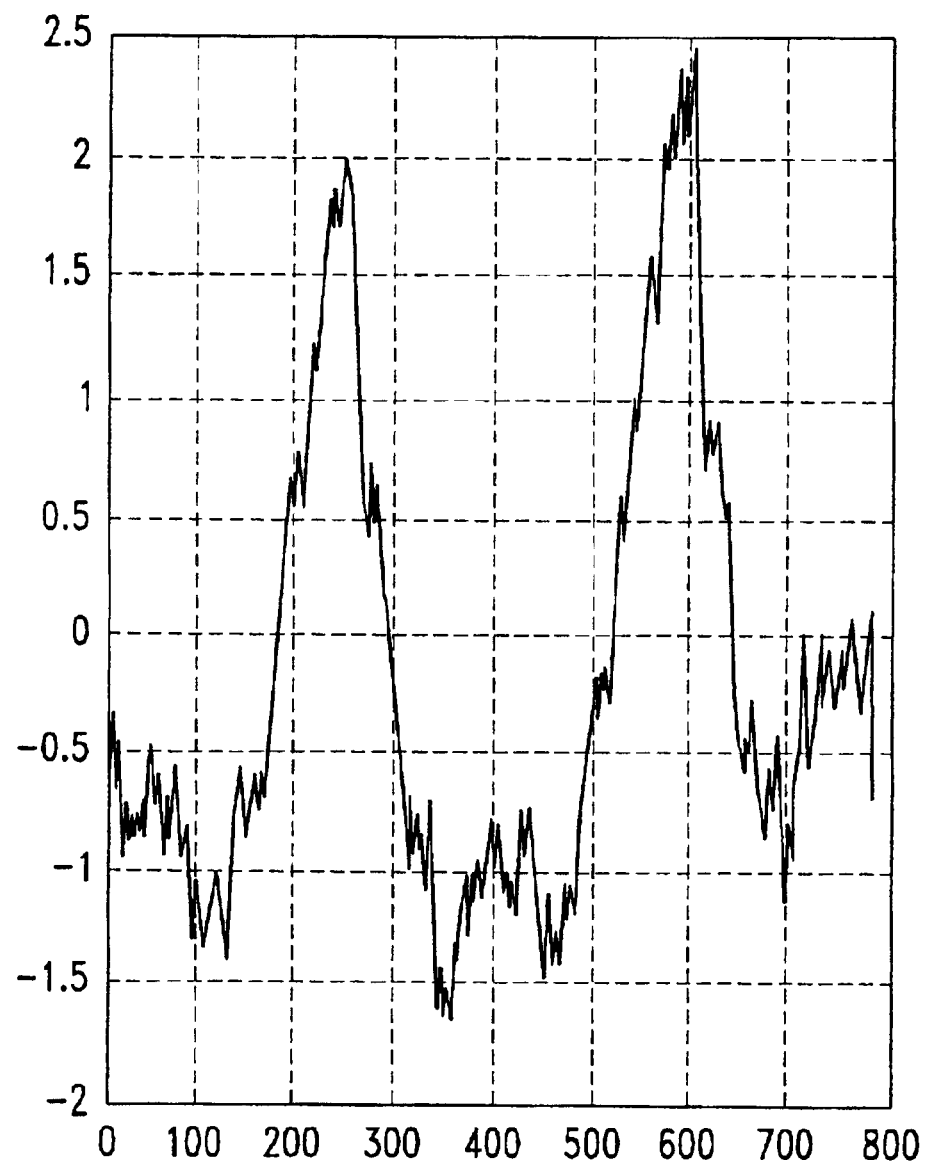

The advantages of the method and filter illustrated herein are described below. First, the method and filter reduce the noise of the input signal, whether the noise in question is of a white type or of a colored type, and enable separation of signals having different features. The filter preserves the steep edges of the signals without causing any losses of signal features, as is evident from a comparison between FIGS. 10A, 10B, and 10C. In particular, FIG. 10A is a plot of a non-noisy voice signal (namely, a signal fragment corresponding to the vowel "e," with sampling at 44.1 kHz and a 16-bit A-D conversion resolution); FIG. 10B is a plot the same signal as in FIG. 10A, in presence of white noise; and FIG. 10C shows the result of filtration of the signal of FIG. 10A using the filter device 95 of FIG. 7.

Since the filter can be trained, it can be adapted to a specific type of initial signal and can be subsequently modified if so required. For example, the filter can be initially adapted to a first type of acoustic signal (for instance, a male voice with white noise, training being performed with two signals, one in the presence of white noise and one in the absence of noise). Then, the learning step can be repeated for signals of a different type, for example a female voice. The new weights thus calculated can replace the previous ones or be stored in addition to the previous ones; in the latter case, the control unit 206 controlling the filter 1 can control sending, to the units 207–209 (FIG. 9), either of the first or of the second samples according to the use of the filter.

Finally, it is clear that numerous variations and modifications may be made to the method and filter described and illustrated herein, all falling within the scope of the invention, as defined in the annexed claims.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A filtering device for filtering signals having steep edges, comprising at least one neuro-fuzzy filter, the neuro-fuzzy filter comprising:
    a signal-feature calculating unit receiving input samples of a signal to be filtered and generating signal features;
    a neuro-fuzzy network receiving said signal features and generating reconstruction weights; and
    a moving-average reconstruction unit receiving said input samples and said reconstruction weights, and generating output samples from said input samples and said reconstruction weights.

2. The filtering device of claim 1 wherein said signal-feature calculating unit comprises a memory storing a first plurality of input samples forming a first window, and a feature-calculating network receiving said first plurality of input samples and supplying a plurality of features for each one of said input samples.

3. The device of claim 2 wherein said feature-calculating network comprises first feature-providing means that generate, for each of said input samples, a first signal feature correlated to a position of said input sample in said first window; second feature-providing means that generate, for each of said input samples, a second signal feature correlated to the difference between said input sample and a central sample in said first window; and third feature-providing means that generate, for each of said input samples, a third signal feature correlated to the difference between said input sample and an average sample value in said first window.

4. The device of claim 3 wherein said first feature-providing means generate said first signal feature for an input sample according to the relation $$X1(i) = \frac{|i - N|}{N}$$

wherein i is the position of said input sample in said first window, and N is the position of a central sample in said first window.

5. The device of claim 4 wherein said first feature-providing means comprise a first work memory storing said first signal feature for each one of said input samples.

6. The device of claim 3 wherein said second feature-providing means generate said second signal feature for an input sample according to the relation $$X2(i) = \frac{|e(i) - e(N)|}{\max(\text{diff})}$$

wherein e(N) is a central sample in said first window, and max(diff) is the maximum of the differences between all the input samples in said first window and said central sample.

7. The device of claim 3 wherein said third feature-providing means generate said third signal feature for an input sample according to the relation $$X3(i) = \frac{|e(i) - av|}{\max(\text{diff\_av})}$$

wherein av is the average value of the input samples in said first window, and max(diff_av) is the maximum of the differences between all the input samples in said first window and said average value av.

8. The device of claim 1 wherein said neuro-fuzzy network (3) comprises:
    fuzzification neurons receiving said signal features of an input sample and generating first-layer outputs defining a confidence level of said signal features with respect to preset membership functions;
    fuzzy neurons of an AND type, receiving said first-layer outputs and generating second-layer outputs deriving from fuzzy rules; and
    a defuzzification neuron receiving said second-layer outputs and generating a reconstruction weight for each of said input samples, using a center-of-gravity criterion.

9. The device of claim 8 wherein said membership functions are gaussian functions, and said first-layer outputs are calculated according to the equation $$oL1(l, k) = \exp\left(-\left(\frac{Xl - W_m(l, k)}{W_v(l, k)}\right)^2\right)$$

wherein oL1(l, k) is a first-layer output, X1 is a signal feature, $W_m(l, k)$ is the mean value, and $W_v(l, k)$ is the variance of a gaussian function.

10. The filtering device of claim 8, comprising two membership functions for each one of said signal features.

11. The filtering device of claim 8 wherein said first-layer neurons comprise a second work memory storing values of said first-layer outputs for each value of said signal features.

12. The filtering device of claim 8 wherein said fuzzy rules are of an AND type, and said second-layer outputs use the norm of the minimum.

13. The filtering device of claim 12 wherein said second-layer outputs are calculated according to the equation $$oL2(n) = \min_n \{W_{FA}(m, n) \cdot oL1(m)\}$$

wherein oL2(n) is a second-layer output; $W_{FA}(m, n)$ is a second-layer weight, and oL1(l, k) is a first-layer output.

14. The filtering device of claim 13 wherein said second-layer neurons comprise a plurality of multiplication units and a plurality of minimum modules cascade-connected together.

15. The filtering device of claim 8 wherein said reconstruction weights are calculated according to the equation $$oL3 = \frac{\sum_{n=1}^{N} W_{DF}(n) \cdot oL2(n)}{\sum_{n=1}^{N} oL2(n)}$$

wherein oL3(n) is a reconstruction weight; $W_{DF}$(n) are third-layer weights, and oL2(n) is a second-layer output.

16. The filtering device of claim 8 wherein said moving-average reconstruction unit receives a second plurality of input samples forming a second window, and a corresponding plurality of reconstruction weights, and calculates each of said output samples according to the equation $$u(i) = \frac{\sum_{j=0}^{2N} oL3(i-j) \cdot e(i-j)}{\sum_{j=0}^{2N} e(i-j)}$$

wherein e(i–j) is an (i–j)-th input sample, and oL3(i–j) is a reconstruction weight associated to an (i–j)-th input sample.

17. The filtering device of claim 8, comprising a training unit having a first input connected to said moving-average reconstruction unit and receiving said output samples, a second input receiving a desired output signal, and an output connected to said neuro-fuzzy network to supply optimized weighting values.

18. The filtering device of claim 2, comprising a first splitting stage generating at least two streams of samples to be filtered; one said neuro-fuzzy filter for each stream of samples to be filtered, each of said neuro-fuzzy filters generating a respective stream of filtered samples; and a first recomposition stage receiving said streams of filtered samples and generating a single stream of output samples.

19. The filtering device of claim 18, comprising a plurality of further splitting stages cascade-connected together and to said first splitting stage, and a plurality of further recomposition stages cascade-connected to each other between said neuro-fuzzy filters and said first recomposition stage.

20. The filtering device of claim 18 wherein said splitting stages each comprise a first and a second analysis filters in phase quadrature to each other and receiving a stream of samples to be split, said first and a second analysis filters generating a respected stream of split samples, and a first and a second downsampling unit, each of which receives a respective stream of split samples, and wherein said recomposition stages each comprise a first and a second upsampling units, each first and a second upsampling units receiving a respective stream of samples to be incremented and generating a respective stream of incremented samples; a first and a second synthesis filters in quadrature with to each other and complementary to said analysis filters, each of said first and a second synthesis filters receiving a respective stream of incremented samples and generating a respective stream of partial samples; and an adder node receiving said streams of partial samples and generating a stream of added samples.

21. The filtering device of claim 20 wherein said analysis filters are quadrature mirror filters, and said synthesis filters ($G_0$, $G_1$; $G_{021}$–$G_{102}$) are QMFs complementary to said analysis filters.

22. The filtering device of claim 21 wherein said quadrature mirror filters are convolutive filters.

23. A method for reducing noise in a signal having sharp edges, comprising the steps of:

calculating signal features from input samples of a signal to be filtered;
calculating reconstruction weights from said signal features using a neuro-fuzzy network; and
reconstructing, from said input samples and said reconstruction weights and using a moving-average filter, an output signal including a plurality of output samples.

24. The method of claim 23, comprising the steps of:
storing a first plurality of input samples forming a first window; and
calculating, from said first plurality of input samples, a plurality of signal features for each of said input samples.

25. The method of claim 24 wherein said step of calculating a plurality of signal features for each of said input samples comprises the steps of:
calculating a first signal feature correlated to a position of said input sample in said first window;
calculating a second signal feature correlated to the difference between said input sample and a central sample in said first window; and
calculating a third signal feature correlated to the difference between said input sample and an average sample value av in said first window.

26. The method of claim 24 wherein said step of calculating reconstruction weights comprises the steps of:
performing a fuzzification operation and calculating first-layer outputs defining confidence levels of said signal features with respect to preset membership functions;
performing a fuzzy AND operation and generating second-layer outputs deriving from fuzzy rules, starting from said first-layer outputs; and
performing a defuzzification operation on said second-layer outputs and generating a reconstruction weight for each one of said input samples, using a center-of-gravity criterion of the.

27. The method of claim 26 wherein said membership functions are gaussian functions, and said first-layer outputs are calculated according to the equation $$oL1(l, k) = \exp\left(-\left(\frac{Xl - W_m(l, k)}{W_v(l, k)}\right)^2\right)$$

wherein oL1(l, k) is a first-layer output, X1 is a signal feature, $W_m$(l, k) is the mean value, and $W_v$(l, k) is the variance of a gaussian function.

28. The method of claim 26 wherein said second-layer outputs are calculated according to the equation $$oL2(n) = \min_n \{W_{FA}(m, n) \cdot oL1(m)\}$$

wherein oL2(n) is a second-layer output; $W_{FA}$(m, n) is a second-layer weight, and oL1(l, k) is a first-layer output.

29. The method of claim 26 wherein said reconstruction weights are calculated according to the equation $$oL3 = \frac{\sum_{n=1}^{N} W_{DF}(n) \cdot oL2(n)}{\sum_{n=1}^{N} oL2(n)}$$

wherein oL3 is a reconstruction weight; $W_{DF}$(n) are third-layer weights, and oL2(n) is a second-layer output.

30. The method of claim 24, wherein said step of reconstructing using a moving-average filter comprises the steps of:
   receiving a second plurality of input samples forming a second window, and a respective plurality of reconstruction weights; and
   calculating each of said output samples according to the equation $$u(i) = \frac{\sum_{j=0}^{2N} oL3(i-j) \cdot e(i-j)}{\sum_{j=0}^{2N} e(i-j)}$$

wherein e(i–j) is an (i–j)-th input sample, and oL3(i–j) is a reconstruction weight associated to an (i–j)-th input sample.

31. The method of claim 23, comprising a training step for training weights used in said neuro-fuzzy filtering step.

32. The method of claim 31 wherein said training step comprises the steps of:
   generating an input signal having a known configuration;
   filtering said input signal having a known configuration to obtain a test output signal;
   comparing said test output signal with a desired signal to obtain a distance between said test output signal and said desired signal;
   calculating a fitness function from said distance; and
   optimizing said weights in accordance with said fitness function.

33. The method of claim 24, comprising a multiresolution analysis whereby the signal is split into sub-bands through orthonormal wavelets.

34. The method of claim 33, comprising the steps of:
   splitting a stream of input samples into at least two streams of samples to be filtered;
   filtering each stream of samples to be filtered using a respective neuro-fuzzy filter to obtain at least two streams of filtered samples; and
   recomposing said streams of filtered samples to generate a single stream of output samples.

35. The method of claim 34 wherein, before performing said step of filtering, said step of splitting is repeated a preset number of times, and in that, after performing said step of filtering, said step of recomposing is repeated said preset number of times.

36. The method of claim 34 wherein said step of splitting comprises the steps of:
   feeding a stream of samples to be split to two analysis filters in phase quadrature to each other;
   generating two streams of filtered split samples; and
   downsampling said streams of filtered split samples,
   and in that said step of recomposing comprises the steps of:
   upsampling streams of samples to be incremented, generating streams of incremented samples;
   filtering said streams of incremented samples using two synthesis filters in phase quadrature to each other and complementary to said analysis filters, generating streams of partial samples; and
   adding pairs of streams of partial samples and generating a stream of added samples.

37. A filtering device for filtering signals, comprising:
   a signal-feature calculating circuit configured to receive input samples of a signal to be filtered and to generate signal features therefrom;
   a neuro-fuzzy network circuit coupled to the signal-feature calculating circuit and configured to receive the signal features and to generate reconstruction weight signals therefrom;
   a moving-average reconstruction circuit coupled to the neuro-fuzzy network circuit and configured to receive the input samples and the reconstruction weight signals and to generate therefrom output samples; and
   a training circuit having a first input coupled to the moving-average reconstruction circuit for receiving the output samples, a second input for receiving a desired output signal, and an output coupled to the neuro-fuzzy network circuit, the training unit configured to supply on the output optimized weighting value signals.

38. A filtering device for filtering signals, comprising:
   a signal-feature calculating circuit configured to receive input samples of a signal to be filtered and to generate signal features therefrom;
   a neuro-fuzzy network circuit coupled to the signal-feature calculating circuit and configured to receive the signal features and to generate reconstruction weight signals therefrom;
   a moving-average reconstruction circuit coupled to the neuro-fuzzy network circuit and configured to receive the input samples and the reconstruction weight signals and to generate therefrom output samples, the neuro-fuzzy network circuit comprising fuzzification neurons receiving the signal features of the input sample and configured to generate first-layer outputs defining a confidence level of the signal features with respect to preset membership functions, fuzzy neurons of an AND type receiving the first layer outputs and configured to generate second-layer outputs derived from fuzzy rules, and a defuzzification neuron receiving the second-layer outputs and configured to generate a reconstruction weight signal for each of the input samples using a center-of-gravity criterion; and
   a training circuit having a first input coupled to the moving-average reconstruction circuit for receiving the output samples, a second input for receiving a desired output signal, and an output coupled to the neuro-fuzzy network circuit, the training unit configured to supply on the output optimized weighting value signals.

39. A filtering device, comprising:
   a first splitting stage receiving input samples of a signal to be filtered and generating at least two streams of samples to be filtered;
   a neuro-fuzzy filter for each stream of samples to be filtered, each neuro-fuzzy filter generating a respective stream of filtered samples and comprising:
      a signal-feature calculating circuit receiving one of the at least two streams of samples to be filtered and configured to generate signal features therefrom;
      a neuro-fuzzy network circuit coupled to the signal-feature calculating circuit and configured to receive the signal features and to generate reconstruction weight signals therefrom; and
      a moving-average reconstruction circuit receiving the input samples and the reconstruction weight signals and generating output samples therefrom; and
   a first recomposition stage receiving a stream of filtered samples from each neuro-fuzzy filter and generating therefrom a single stream of output samples.

40. A filtering device, comprising:
   a first splitting stage receiving input samples of a signal to be filtered and generating at least two streams of samples to be filtered;
   a neuro-fuzzy filter for each stream of samples to be filtered, each neuro-fuzzy filter generating a respective stream of filtered samples and comprising:

a signal-feature calculating circuit receiving one of the at least streams of samples to be filtered and configured to generate signal features therefrom;

a neuro-fuzzy network circuit coupled to the signal-feature calculating circuit and configured to receive the signal features and to generate reconstruction weight signals therefrom;

a moving-average reconstruction circuit receiving the input samples and the reconstruction weight signals and generating output samples therefrom; and a training circuit having a first input coupled to the moving-average reconstruction circuit and receiving the output samples, a second input receiving a desired output signal, and an output coupled to the neuro-fuzzy network circuit and configured to supply optimized weighting value signals thereto; and a first recomposition stage receiving a stream of filtered samples from each neuro-fuzzy filter and generating therefrom a single stream of output samples.

* * * * *